United States Patent Office 3,354,222
Patented Nov. 21, 1967

3,354,222
POLYPHENYL ETHER KETONES
Edward S. Blake and George F. Deebel, Dayton, Ohio, assignors to Monsanto Research Corporation, St. Louis, Mo., a corporation of Delaware
No Drawing. Filed July 30, 1965, Ser. No. 476,153
9 Claims. (Cl. 260—592)

This invention relates to polyphenyl ether ketones and more particularly provides certain new and valuable ar-phenoxyphenoxy - α,α,α - trialkylacetophenones and the method of preparing the same.

According to the invention, the presently provided ketones are prepared by the reaction of a cadmium derivative, e.g., bis(phenoxyphenoxyphenyl)cadmium, of the formula

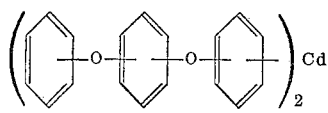

with an acyl halide of the formula

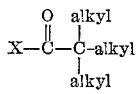

wherein X is halogen having an atomic weight greater than 19, and alkyl contains from 1 to 5 carbon atoms. The reaction occurs by the replacement of cadmium from the cadmium derivative by an acyl radical and formation of cadmium halide, as represented by the following equation:

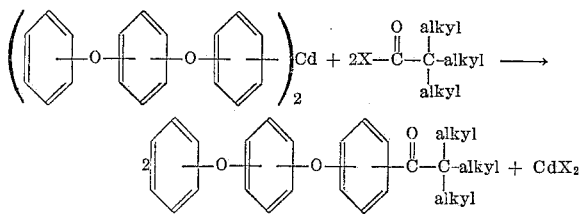

The cadmium derivative is conveniently prepared from a halophenoxyphenoxybenzene by way of its Grignard derivative, i.e., the phenoxyphenoxyphenylmagnesium halide, which is caused to react with cadmium chloride. This series of reactions is represented by the following equations:

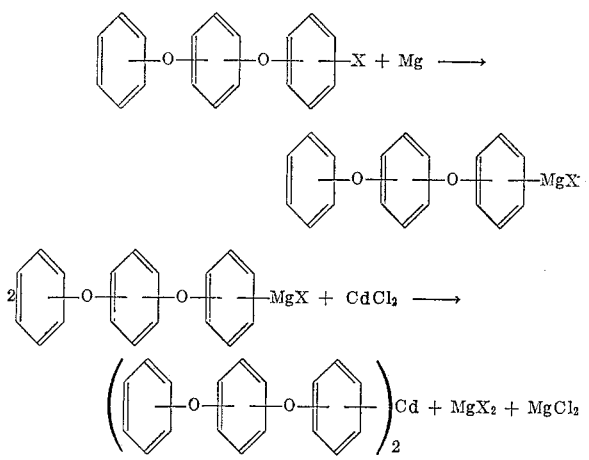

Halophenoxyphenoxybenzenes which are useful for the present purpose include, e.g., 1-(o-, m- or p-bromophenoxy)-2-phenoxybenzene, 1-(o-, m- or p-bromophenoxy)-3-phenoxybenzene, 1-(o-, m- or p-bromophenoxy)-4-phenoxybenzene, 1-(o-, m- or p-chlorophenoxy)-3-phenoxybenzene, or 1-(o-, m- or p-iodophenoxy)-4-phenoxybenzene.

Thus, the cadmium derivative obtained from 1-(o-, m- or p-bromophenoxy)-2-phenoxybenzene is bis[o-, m- or p - (o-phenoxyphenoxy)phenyl]cadmium, and it reacts with pivaloyl chloride to give o-, m- or p-(o-phenoxyphenoxy)pivalophenone; the cadmium derivative obtained from 1-(o-, m- or p-bromophenoxy)-3-phenoxybenzene is bis[o-, m- or p-(m-phenoxyphenoxy)phenyl]cadmium and it reacts with 2,2-dimethylvaleryl chloride to give o-, m- or p-(m-phenoxyphenoxy) - 2,2 - dimethylvalerophenone; the cadmium derivative obtained from 1-(o-, m- or p-chlorophenoxy)-3-phenoxybenzene is bis[o-, m- or p-(m-phenoxyphenoxy)phenyl]cadmium and it reacts with 2,2-dimethylheptanoyl chloride to give o-, m- or p-(m-phenoxyphenoxy)-2,2-dimethylheptanophenone; and the cadmium derivative obtained from 1-(o-, m- or p-iodophenoxy)-4-phenoxybenzene is bis[o-, m- or p-(p-phenoxyphenoxy)phenyl]cadmium and it reacts with 2-ethyl-2-methylbutyryl chloride to give o-, m- or p-(p-phenoxyphenoxy)-2-ethyl-2-methylbutyrophenone.

The useful acyl halides include, e.g., pivaloyl chloride, 2,2-dimethylbutyryl bromide, 2,2-dimethylisovaleryl iodide, 2,2-dimethylvaleryl chloride, 2,2-dimethylhexanoyl bromide, 2,2-dimethylheptanoyl chloride and 2-ethyl-2-methylbutyryl chloride.

Reaction of the bis(phenoxyphenoxyphenyl)cadmium with the acyl halide takes place by simply contacting the cadmium derivative with the acyl halide at ambient temperature or with heating. Generally, the reaction rate is accelerated by heating, so that a higher reaction temperature shortens the time for reaction. Generally, depending upon the nature of the individual reactants, temperatures of from 0° C. to 150° C., and preferably of from about 25° C. to 120° C. are useful.

The reaction may or may not be conducted in the presence of an inert organic liquid diluent or solvent, e.g., a hydrocarbon such as benzene, toluene or xylene; or an ether such as ethyl ether, dioxane or tetrahydrofuran.

The proportion of reactants may be varied from equivalent amounts, i.e., two moles of acyl halide for each mole of cadmium derivative, to excess amounts of either the acyl halide or the cadmium derivative. It may be preferred to use excess acyl halide to insure maximum utilization of the cadmium derivative, or excess acyl halide may even be used as the diluent in which the reaction is conducted. Any excess of the halide may be readily recovered from the final reaction mixture, e.g., by vacuum distillation or solvent extraction.

All of the reaction conditions, i.e., whether or not a diluent is employed, the nature of the diluent if it is used, the temperature, pressure, reaction time, reaction proportions, etc., can be readily arrived at by easy experimentation. Thus, arrival at optimum reaction conditions is simply a matter of routine procedure by one skilled in the art.

The presently provided ar-phenoxyphenoxy-α,α,α-trialkylacetophenones are stable, well-defined compounds which are generally clear, high-boiling liquids. They are generally liquid over wide temperature ranges, possess high flash points and high ignition points, and are characterized by good thermal stability. Hence, they are eminently suited for use as lubricants, especially for high temperature service, say at 450° F. or higher. Of particular significance is their oxidative stability at high temperatures, as hereinafter disclosed. They are also useful as hydraulic fluids, heat-transfer agents, softening additives for paper or textile coatings, and plasticizers for synthetic resins and plastics, e.g., polyvinyl chloride.

These products are compatible with and may be used with additives customarily used with lubricants and functional fluids, e.g., corrosion inhibitors, antioxidants, viscosity-index improvers, etc.

The invention is further illustrated by, but not limited to, the following examples.

EXAMPLE 1

*Preparation of m-(m-phenoxyphenoxy)pivalophenone*

A mixture of 171 g. (0.5 mole) 1-(m-bromophenoxy)-3-phenoxybenzene and 12.2 g. (0.5 mole) magnesium turnings in 250 ml. dry tetrahydrofuran was stirred and heated to reflux until the magnesium had completely reacted.

Bis[m-(m-phenoxyphenoxy)phenyl]cadmium was prepared by adding to this Grignard solution 45.8 g. (0.25 mole) dry cadmium chloride and subsequently removing the tetrahydrofuran by vacuum distillation. The resulting sludge was thinned with 300 ml. dry benzene, and 60.3 g. (0.5 mole) pivaloyl chloride was added. The mixture was stirred and heated at reflux for 6 hours to complete the reaction. The reaction mixture was poured into 400 ml. water containing 100 ml. 20% sulfuric acid, and the organic layer was separated and washed successively with saturated salt solution, 10% sodium hydroxide at 34° C. for 0.5 hour, and finally with salt solution to neutrality. Distillation gave 148 g. (86% yield) of product, B.P. 158° C./0.05 mm., $n_D^{25}$=1.5825. Redistillation and filtration through Hyflo-Super Cel, alumina, and Attapulgus clay gave a water-white liquid which was shown to be m-(m-phenoxyphenoxy)pivalophenone by chemical analysis:

Found: C, 79.53%; H, 6.33%. Calcd. for $C_{23}H_{22}O_3$: C, 79.77%; H, 6.36%.

Kinematic viscosities, determined at 100° F. and 210° F., by ASTM D445-61 using Cannon-Manning Semi-Micro Type Viscometers, were respectively: 65.24 and 6.107 centistokes.

EXAMPLE 2

*Preparation of m-(m-phenoxyphenoxy)-2,2-dimethylvalerophenone*

A Grignard solution was prepared from 171 g. (0.5 mole) 1-(m-bromophenoxy)-3-phenoxybenzene, and from it bis[m-(m-phenoxyphenoxy)phenyl]cadmium was prepared as in Example 1. The sludge was thinned with 300 ml. dry benzene, and 74.3 g. (0.5 mole) 2,2-dimethylvaleryl chloride was added. The mixture was stirred and heated at reflux for 1.5 hours to complete the reaction, and then was poured into 1000 ml. water containing 20 ml. concentrated sulfuric acid. The organic layer was separated and washed successively with saturated salt solution, 10% potassium hydroxide at 40° C. for 0.5 hour, and finally with salt solution to neutrality. Distillation gave 139 g. (75% yield) of light straw-colored liquid, B.P. 176° C./0.05 mm., $n_D^{25}$=1.5739, which was shown to be m-(m-phenoxyphenoxy)-2,2-dimethylvalerophenone by chemical analysis:

Found: C, 80.06%; H, 7.05%. Calcd. for $C_{25}H_{26}O_3$: C, 80.21%; H, 6.95%.

Kinematic viscosities, determined at 100° and 210° F., as in Example 1 were respectively: 68.09 and 6.153 centistokes.

EXAMPLE 3

*Preparation of m-(m-phenoxyphenoxy)-2,2-dimethylheptanophenone*

A Grignard solution was prepared from 171 g. (0.5 mole) 1-(m-bromophenoxy)-3-phenoxybenzene and converted to bis[m-(m-phenoxyphenoxy)phenyl]cadmium as in Example 1. The sludge was thinned with 300 ml. dry benzene, and 83 g. (0.47 mole) 2,2-dimethylheptanoyl chloride was added. The mixture was stirred and heated at reflux for 5 hours to complete the reaction, and then was poured into 500 ml. water. The organic layer was washed successively with 10% hydrochloric acid, saturated salt water, 10% sodium hydroxide at 50° C. for 1 hour, and finally with salt water to neutrality. Distillation gave 153 g. (76%) of colorless liquid, B.P. 185° C./0.04 mm., $n_D^{25}$=1.5672, which was shown to be m-(m-phenoxyphenoxy)-2,2-dimethylheptanophenone by chemical analysis:

Found: C, 80.72%; H, 7.40%. Calcd. for $C_{27}H_{30}O_3$: C, 80.59%; H, 7.48%.

Kinematic viscosities, determined at 100° F. and 210° F., as in Example 1 were respectively: 91.64 and 7.072 centistokes.

EXAMPLE 4

*Oxidative stability*

Samples of the products of Examples 1–3 above were subjected to oxidation by bubbling air through them at the rate of 20 liters per hour for 24 hours, while maintaining the sample temperature at 450° F. The weight loss and the change in viscosity were recorded. These data are shown in the table below. For comparison, the oxidative stability data are included for pentaerythritol tetracaproate, a well known synthetic lubricant.

OXIDATIVE STABILITY DATA

| Compound | Weight Loss, Percent | Percent Change in Viscosity | |
|---|---|---|---|
| | | Detd. at 100° F. | Detd. at 210° F. |
| Example 1 | 8.0 | 4.2 | 1.3 |
| Example 2 | 8.3 | 23.4 | 9.9 |
| Example 3 | 13.8 | 175 | 59.5 |
| Pentaerythritol tetracaproate | 64.8 | (*) | (*) |

*Too viscous to measure.

It is to be understood that although the invention has been described with specific reference to particular embodiments thereof, it is not to be so limited since changes and alterations therein may be made which are within the full intended scope of this invention as defined by the appended claims.

What we claim is:

1. A compound of the formula

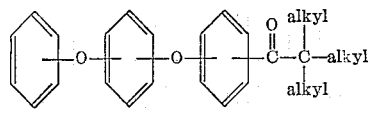

wherein alkyl contains from 1 to 5 carbon atoms.

2. A compound of the formula

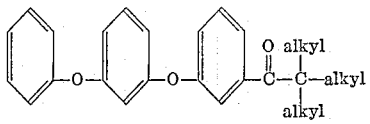

wherein alkyl contains from 1 to 5 carbon atoms.

3. A compound of the formula

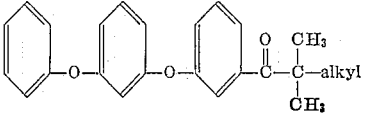

wherein alkyl contains from 1 to 5 carbon atoms.

4. m-(m-Phenoxyphenoxy)pivalophenone.

5. m - (m - Phenoxyphenoxy) - 2,2 - dimethylvalerophenone.

6. m - (m - Phenoxyphenoxy) - 2,2 - dimethylheptanophenone.

7. The method which comprises contacting a bis(phenoxyphenoxyphenyl)cadmium of the formula

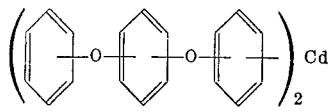

with an acyl halide of the formula

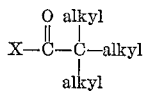

wherein X is halogen having atomic weight greater than 19, and alkyl contains from 1 to 5 carbon atoms.

8. The method which comprises contacting a bis(phenoxyphenoxyphenyl)cadmium of the formula

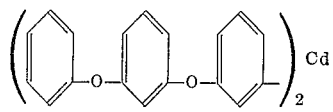

with an acyl halide of the formula

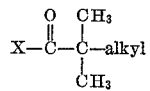

wherein X is halogen having an atomic weight greater than 19 and alkyl contains from 1 to 5 carbon atoms.

9. The method defined in claim 7, further limited in that X is chlorine.

References Cited
UNITED STATES PATENTS 2,853,523  9/1958  Van Glahn et al. _____ 260—591
3,073,866  1/1963  Stanley _____ 260—591

LEON ZITVER, *Primary Examiner.*
DANIEL D. HORWITZ, *Examiner.*